United States Patent
Zimmel et al.

(10) Patent No.: US 7,147,385 B2
(45) Date of Patent: *Dec. 12, 2006

(54) FIBER OPTIC CONNECTOR AND METHOD

(75) Inventors: Steven C. Zimmel, Minneapolis, MN (US); Keith Q. Nelson, Brooklyn Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/116,587

(22) Filed: Apr. 27, 2005

(65) Prior Publication Data

US 2005/0232554 A1  Oct. 20, 2005

Related U.S. Application Data

(63) Continuation of application No. 10/060,970, filed on Jan. 30, 2002, now Pat. No. 6,916,120.

(51) Int. Cl.
  *G02B 6/36*  (2006.01)
(52) U.S. Cl. ...................................................... 385/78
(58) Field of Classification Search .................. 385/78, 385/76, 53, 79, 139, 92
  See application file for complete search history.

(56) References Cited

U.S. PATENT DOCUMENTS

| | | | | |
|---|---|---|---|---|
| 4,579,418 A | * | 4/1986 | Parchet et al. ................. | 385/60 |
| 4,747,659 A | * | 5/1988 | Takahashi ..................... | 385/67 |
| 5,016,970 A | * | 5/1991 | Nagase et al. ................. | 385/60 |
| 5,096,276 A | * | 3/1992 | Gerace et al. ................. | 385/76 |
| 5,136,681 A | * | 8/1992 | Takahashi .................... | 385/140 |
| 5,142,598 A | * | 8/1992 | Tabone ......................... | 385/78 |
| 5,146,525 A | | 9/1992 | Tabone | |
| 5,148,525 A | * | 9/1992 | Ohga et al. ................... | 710/107 |
| 5,212,252 A | * | 5/1993 | Aoki et al. ................... | 525/327.3 |
| 5,212,752 A | | 5/1993 | Stephenson et al. | |
| 5,257,333 A | * | 10/1993 | Nodfelt ........................ | 385/64 |
| 5,317,663 A | * | 5/1994 | Beard et al. ................... | 385/70 |
| 5,390,269 A | * | 2/1995 | Palecek et al. ............... | 385/78 |
| 5,633,970 A | * | 5/1997 | Olson et al. .................. | 385/78 |

(Continued)

FOREIGN PATENT DOCUMENTS

EP   1 072 914 A2   1/2001

(Continued)

OTHER PUBLICATIONS

Drawing of a connector by ADC Telecommunications, Inc., 1 sheet, admitted as prior art.

(Continued)

*Primary Examiner*—Phuong Dinh
(74) *Attorney, Agent, or Firm*—Merchant & Gould P.C.

(57) ABSTRACT

A fiber optic connector including a ferrule surrounding an optical fiber and a hub engaging the ferrule. The hub includes a front portion having first and second opposing surfaces and first and second tapered regions extending from the first and second opposing surfaces to a front face. A housing includes an anti-rotation seat configured to engage the first and second opposing surfaces, the anti-rotation seat including parallel first and second contact lines positioned at a front of the anti-rotation seat. A spring within a chamber of the housing biases the ferrule through a bore in the front of the housing. The first tapered region of the hub engages the first contact line and the second tapered region engages the second contact line when the hub and ferrule are in a first rotational position so that the optical fiber is maintained at a known orientation with respect to the connector.

9 Claims, 8 Drawing Sheets

U.S. PATENT DOCUMENTS

| | | | |
|---|---|---|---|
| 5,682,451 A * | 10/1997 | Lee et al. | 385/78 |
| 5,734,769 A * | 3/1998 | Lu | 385/61 |
| 5,852,694 A * | 12/1998 | Kimura et al. | 385/78 |
| 5,946,436 A * | 8/1999 | Takashi | 385/60 |
| 6,102,581 A | 8/2000 | Deveau | |
| 6,142,676 A * | 11/2000 | Lu | 385/60 |
| 6,155,146 A | 12/2000 | Andrews | |
| 6,206,581 B1 | 3/2001 | Driscoll et al. | |
| 6,287,018 B1 | 9/2001 | Andrews | |
| 6,428,215 B1 * | 8/2002 | Nault | 385/78 |
| 6,464,402 B1 | 10/2002 | Andrews | |
| 6,550,978 B1 * | 4/2003 | De Marchi | 385/60 |
| 6,550,979 B1 * | 4/2003 | Fleenor et al. | 385/78 |
| 6,913,392 B1 | 7/2005 | Grzegorzewska et al. | |
| 6,916,120 B1 * | 7/2005 | Zimmel et al. | 385/78 |

FOREIGN PATENT DOCUMENTS

| | | |
|---|---|---|
| EP | 1 072 915 A2 | 1/2001 |
| JP | 57-74714 | 5/1982 |
| JP | 3-84801 | 8/1991 |
| JP | 7-56053 | 3/1995 |

OTHER PUBLICATIONS

Suhner Fiberoptic, *Adjusting instructions*, Dok-Nr.: 52.01.4001.4, pp. 1-7, issued Mar. 30, 1994, last amendment May 18, 2001.

* cited by examiner

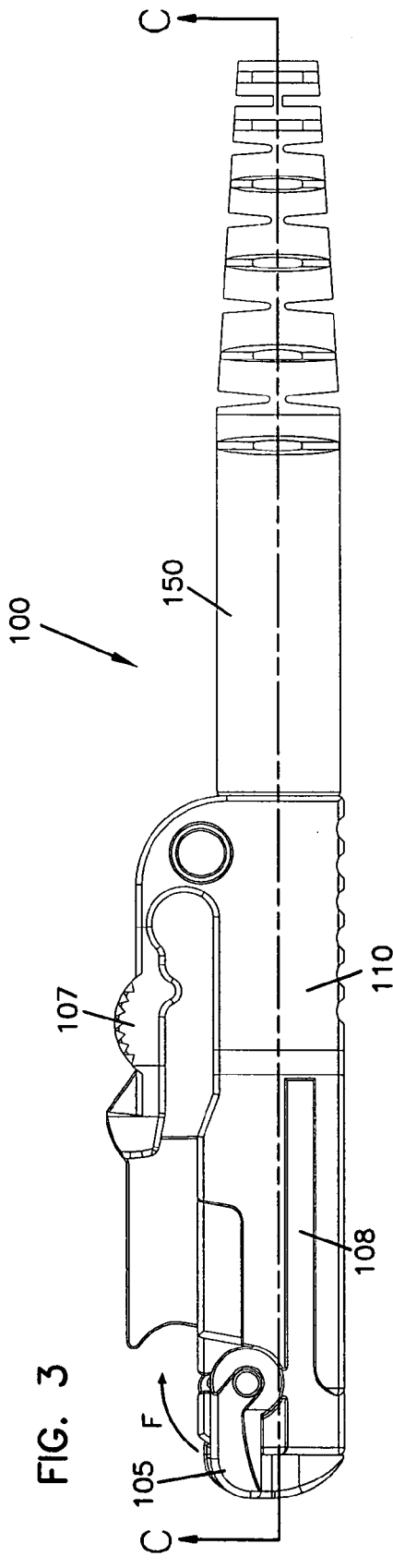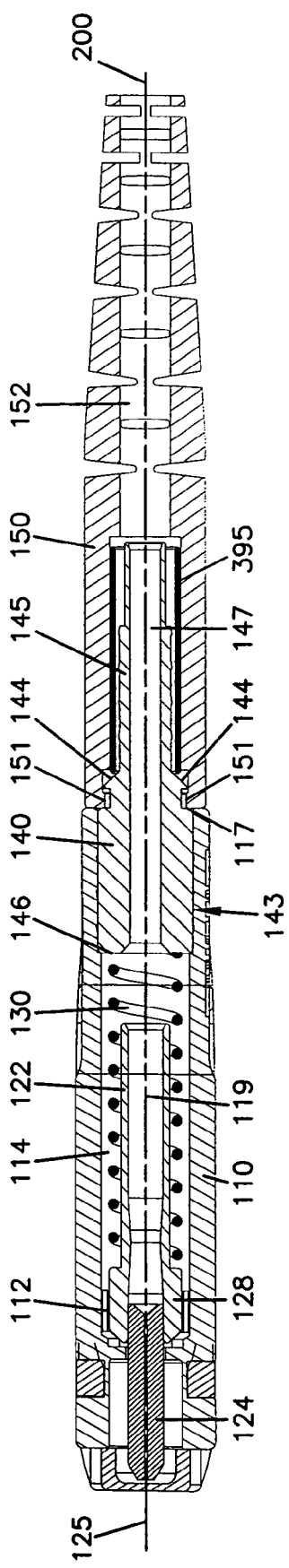

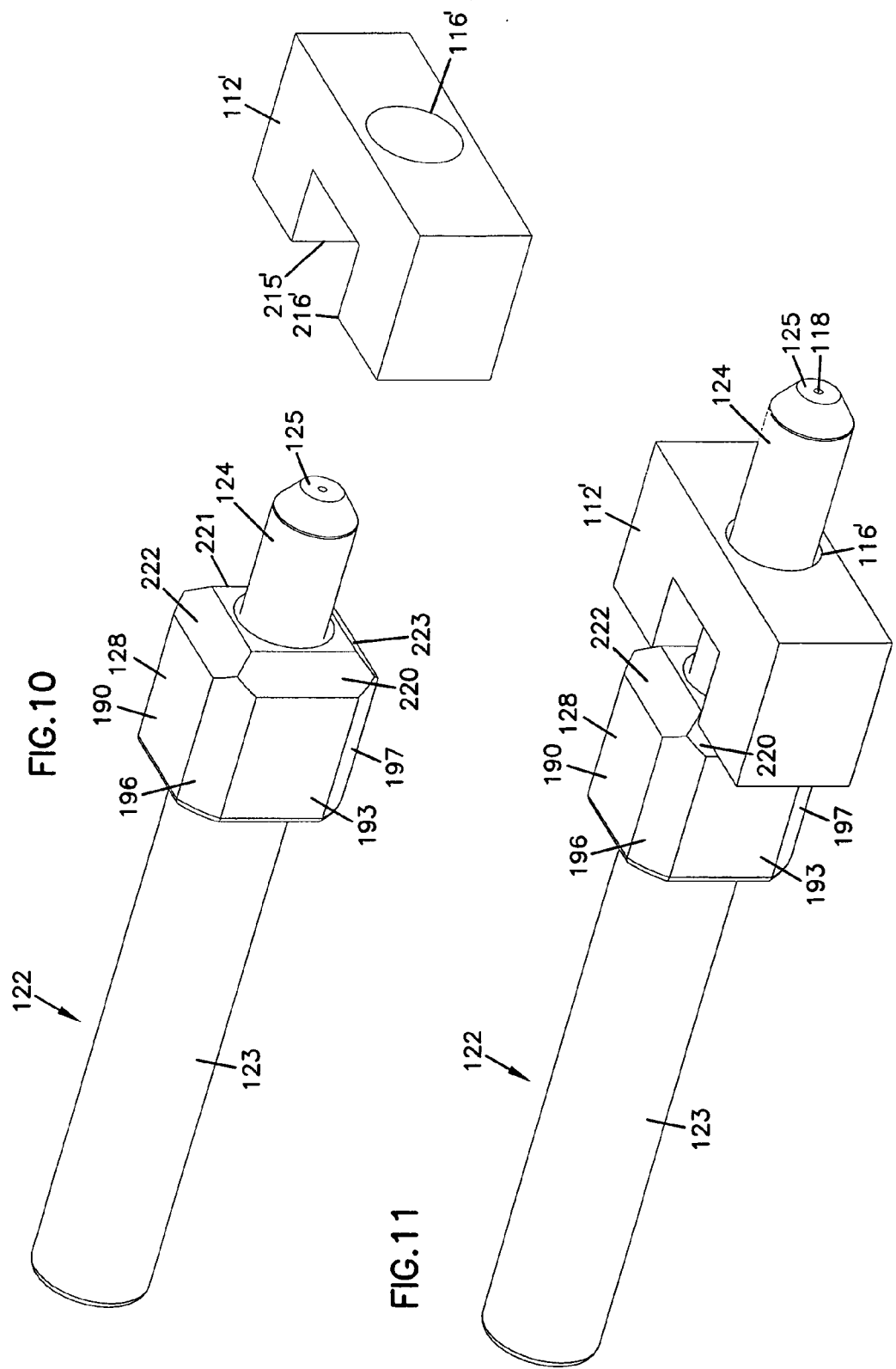

FIBER OPTIC CONNECTOR AND METHOD

CROSS-REFERENCE TO RELATED APPLICATION

This application is a continuation of application Ser. No. 10/060,970, filed Jan. 30, 2002, now U.S. Pat. No. 6,916,120 which application is incorporated herein by reference in its entirety.

TECHNICAL FIELD

The present invention relates to fiber optic connectors for use in an optical fiber signal transmission system, and to methods for assembling such fiber optic connectors.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It may therefore be desirable to tune a connector to minimize this signal loss.

Tuning can be accomplished by measuring signal characteristics through the connector and/or by examining physical properties of the connector, and then determining the optimal position of the ferrule and fiber in the connector.

Rotational misalignment of a ferrule with respect to a connector axis can cause mis-engagement between the ferrule and a ferrule of another connector, thereby contributing to signal loss. This problem is especially acute for angled physical contact connectors. An angled physical contact (APC) connector includes a ferrule and fiber with end faces that are polished to a non-perpendicular angle (for example, 8 degrees to a perpendicular plane) with respect to the longitudinal axis of the connector. APC connectors are discussed in U.S. Pat. No. 5,734,769, assigned to ADC Telecommunications, Inc. The orientation of the end face must be maintained with a high degree of precision so that the angled end face of the optic fiber and associated ferrule correctly engage an end face of an optic fiber and associated ferrule of another angled physical contact connector. Even a few degrees of misalignment can cause significant signal loss.

SUMMARY

The present invention concerns fiber optic connectors, including tunable fiber optic connectors, having a spring biased ferrule and hub assembly held within the connector. If the fiber optic connector is tunable, tuning can be accomplished unseating the ferrule and associated hub from a resting position by pressing the ferrule back into the connector so that an anti-rotation portion of the hub clears a complementary-shaped anti-rotation seat of the connector. In this position, the ferrule can be rotated about a connector axis to the desired rotational alignment that minimizes signal loss. The ferrule can then be released, allowing the anti-rotation portion of the hub to re-engage the anti-rotation seat, thereby preventing further rotation that may cause the connector to become un-tuned.

The anti-rotation seat further includes at least first and second contact lines which maintain the end face of the optic fiber and associated ferrule at a specific rotational angle with respect to the longitudinal axis of the connector when the ferrule is in its resting position. Further, when the ferrule is pushed back into the connector and then allowed to return to its resting position, the contact lines of the anti-rotation seat re-engage the ferrule and associated hub to return the end face of the optic fiber and associated ferrule to the desired orientation.

One aspect of the invention relates to a fiber optic connector including an optical fiber, a ferrule surrounding the optical fiber, a hub retainably engaging the ferrule, wherein the hub includes a front portion having first and second opposing surfaces and first and second tapered regions extending from the first and second opposing surfaces to a front face of the hub at an angle with respect to a longitudinal axis of the connector, a housing defining an anti-rotation seat configured to engage the first and second opposing surfaces of the front portion of the hub, the anti-rotation seat including parallel first and second contact lines positioned at a front of the anti-rotation seat adjacent a bore defined by the housing through which the ferrule extends, and a spring disposed within a chamber defined by the housing and coupled to the anti-rotation seat, the spring biasing the ferrule through the bore of the housing, wherein the first tapered region of the hub engages the first contact line and the second tapered region engages the second contact line when the hub and ferrule are in a first rotational position relative to the housing so that an end of the optical fiber is maintained at a known orientation with respect to the longitudinal axis of the connector.

Another aspect of the invention relates to a hub and ferrule assembly for a fiber optic connector including a ferrule configured to surround an optical fiber, and a hub retainably engaging the ferrule, wherein the hub includes a front portion having first and second opposing surfaces and first and second tapered regions extending from the first and second opposing surfaces to a front face of the hub at an angle with respect to a longitudinal axis extending through a center of the hub and ferrule assembly, wherein the first tapered region is positioned to engage a first contact line on the fiber optic connector and the second tapered region is positioned to engage a second contact line on the fiber optic connector.

Yet another aspect of the invention relates to a fiber optic connector housing including an exterior body configured to be received in a fiber optic adapter, a cavity defined by a rear portion of the connector housing, an anti-rotation seat coupled to the cavity, the anti-rotation seat including a plurality of longitudinally extending surfaces, and first and second contact lines positioned at a front of the anti-rotation seat adjacent a bore; the first and second contact lines being spaced apart on opposite sides of a longitudinal axis of the connector housing and parallel to each other.

Another aspect of the invention relates to a fiber optic connector including an optical fiber, a ferrule surrounding the optical fiber, a hub retainably engaging the ferrule, the hub including an anti-rotation portion, a housing defining an anti-rotation seat configured to engage the anti-rotation portion of the hub, a spring disposed within a chamber defined by the housing and coupled to the anti-rotation seat, the spring biasing the ferrule through the bore of the housing, and an alignment arrangement formed by the connector, the alignment arrangement including first and second tapered regions formed on one of the hub and the housing, and also including first and second parallel contact lines formed on the other of the hub and the housing, the first and second parallel contact lines and the first and second tapered regions being spaced apart on opposite sides of a longitudinal axis of the connector, wherein the first tapered region engages the first contact line and the second tapered region engages the second contact line when the hub and ferrule are in a first rotational position relative to the housing so that an end of the optical fiber is maintained at a known orientation with respect to the longitudinal axis of the connector.

Yet a further aspect of the invention relates to a method for using a fiber optic connector comprising steps of: providing a ferrule surrounding an optical fiber with a hub retainably engaging the ferrule, the hub including opposing first and second tapered portions; providing a housing including a first contact line positioned to engage the first tapered portion and a second contact line positioned to engage the second tapered portion; pushing the ferrule back to disengage the first and second tapered portions of the hub from the first and second contact lines of the housing; and releasing the ferrule so that the first tapered portion engages the first contact line and the second tapered portion engages the second contact line, thereby retaining the optical fiber at a known orientation with respect to the longitudinal axis of the connector.

BRIEF DESCRIPTION OF THE DRAWINGS

FIG. 3 is a side view of the example connector shown in FIG. 1.

FIG. 4 is a cross-sectional view taken along line C—C of the connector shown in FIG. 3.

FIG. 10 is a perspective view of an example embodiment of a hub and ferrule assembly and an example anti-rotation seat including contact lines shown in isolation and made in accordance with the present invention.

FIG. 11 is a perspective view of the hub and ferrule assembly and the anti-rotation seat of FIG. 10 shown in an engaged position.

DETAILED DESCRIPTION OF THE PREFERRED EMBODIMENT

Reference will now be made in detail to exemplary aspects of the present invention that are illustrated in the accompanying drawings. Wherever possible, the same reference numbers will be used throughout the drawings to refer to the same or like parts.

Figure 1:
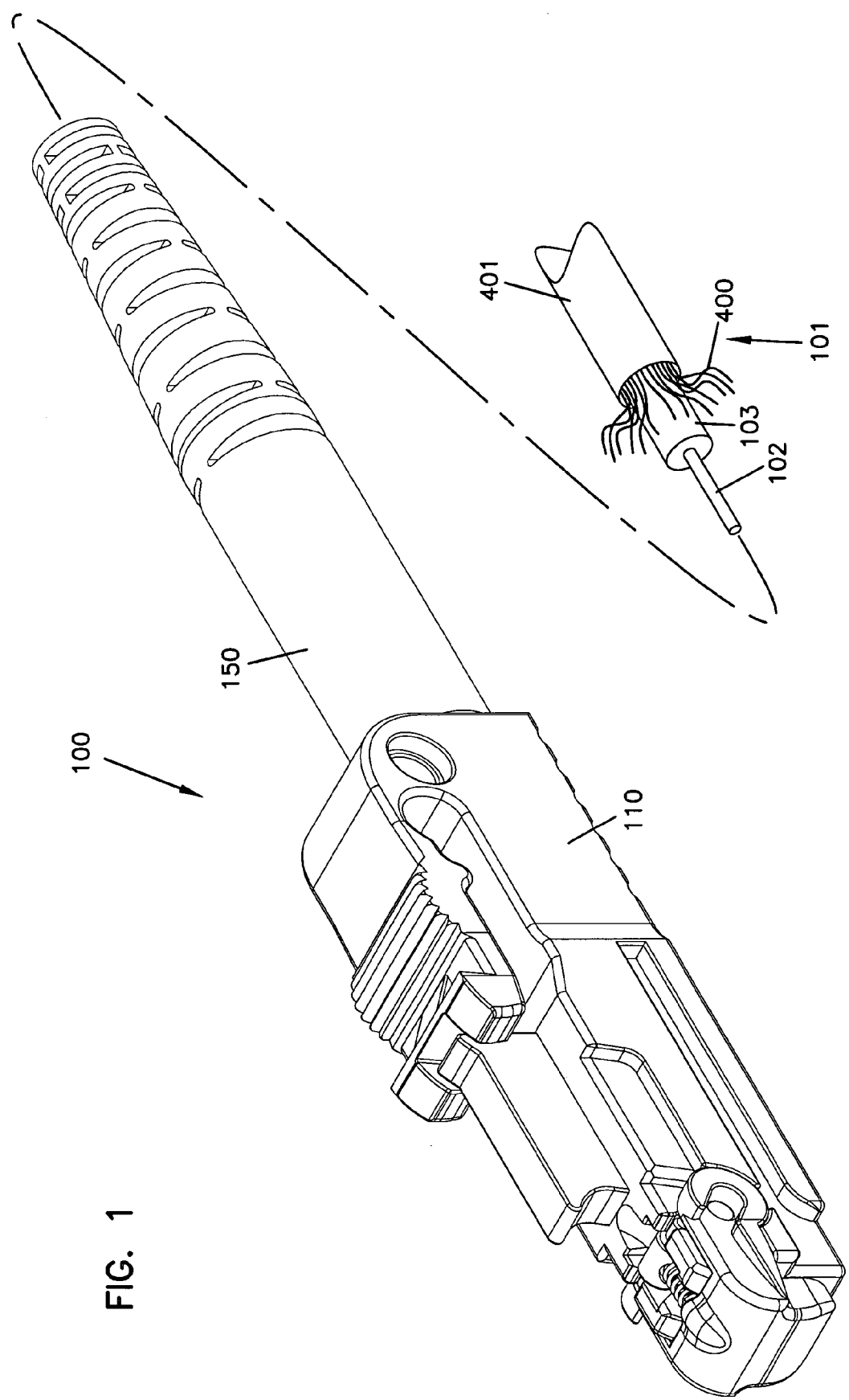
FIG. 1 is a perspective view of an example embodiment of a fiber optic connector made in accordance with the present invention.
Figure 2:
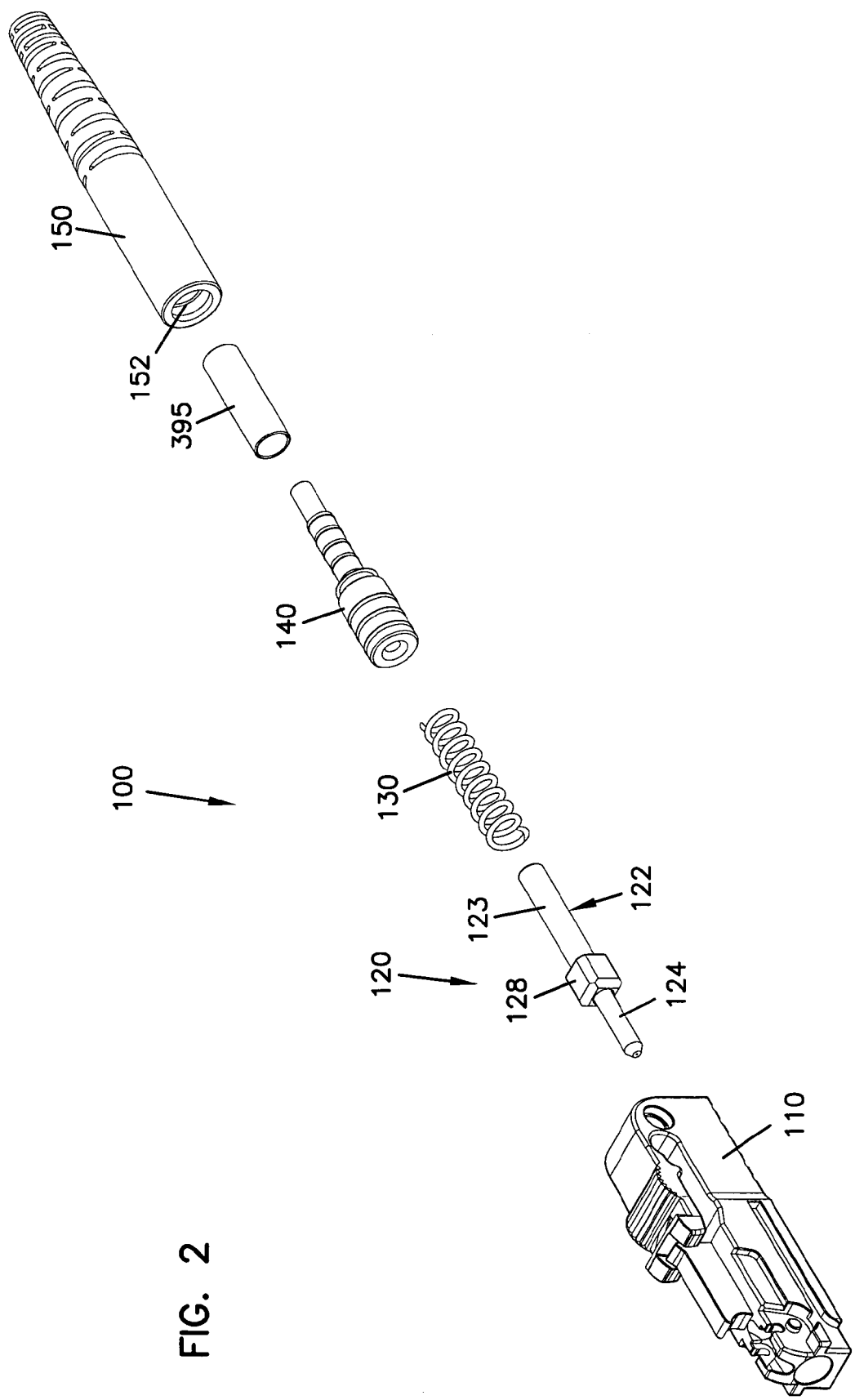
FIG. 2 is an exploded view in perspective of the example connector shown in FIG. 1.

FIGS. 1–3 illustrate an example embodiment of a connector 100 made in accordance with the present invention. The connector 100 includes a front housing 110, a rear housing 140, a crimp ring 395, and a boot 150 with a bore 152. Also included is a hub/ferrule assembly 120 with a hub 122 and a ferrule 124. The hub 122 includes an anti-rotation portion 128 and an elongated cylindrical rear portion 123. The hub 122 is connected to the ferrule 124, such as with adhesive or an interference fit. A spring 130 is also provided. A fiber optic cable 101 is shown including a fiber 102 and an inner jacket 103. A reinforcing layer 400 and an outer jacket 401 surround the fiber 102 and the inner jacket 103. The crimp ring 395 secures the reinforcing layer 400 to the connector 100.

The connector 100 includes a spring-biased pivoting front cover 105 which biases the cover 105 toward the closed position (as shown in FIG. 3) or the open position as the cover 105 is moved in a direction F. Further details of the exterior features of the connector 100 and mating adapter are shown and described in U.S. Pat. No. 6,142,676, the disclosure of which is hereby incorporated by reference. A latch 107 latches connector 100 to the adapter. Guides 108 engage rails on the adapter to guide the connector 100 into the adapter.

The connector 100 may be tunable so that the ferrule and hub assembly 120 may be pushed back, rotated, and released to tune the connector. Alternatively, the connector 100 may not be tunable. The present invention is applicable to tunable and non-tunable connectors.

Figures 5, 6:
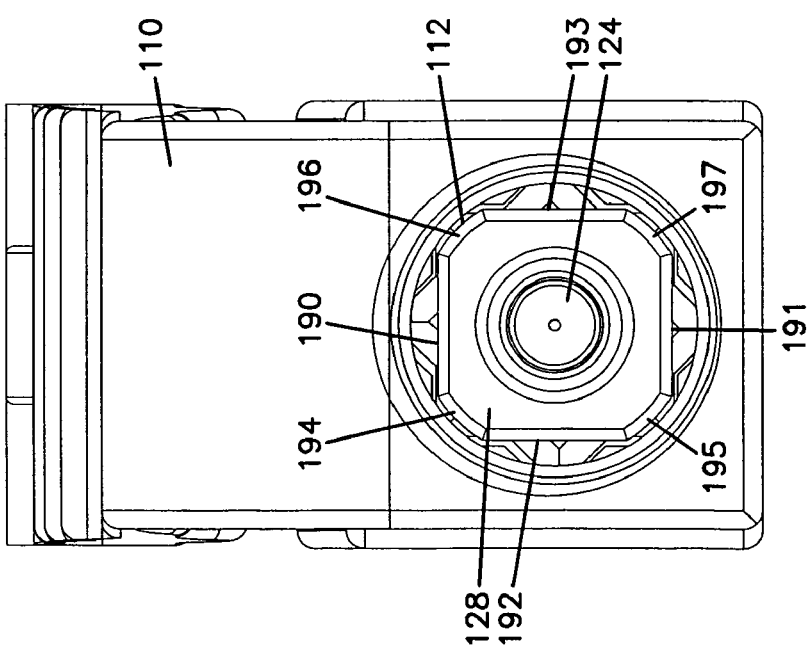
FIG. 5 is a rear view of the connector of FIG. 1 showing the front housing with the hub and ferrule included.
FIG. 6 is an expanded view of a portion of the front housing of the connector of FIG. 5 showing the engagement of the anti-rotation portion of the hub with the anti-rotation seat of the front housing.

Referring now to FIGS. 4–6, the front housing 110 of the connector 100 extends along a longitudinal axis 200 and defines an anti-rotation seat 112 and a cavity 114. The ferrule 124 extends through a front bore 116 of the front housing 110 and includes a passage 118 extending through a face 125 of the ferrule 124. The anti-rotation portion 128 of the hub 122 is slidingly engaged along the longitudinal axis 200 in the anti-rotation seat 112, as described further below.

The spring 130 surrounds the elongated cylindrical rear portion 123 of the hub 122. The spring 130 is captured between the anti-rotation portion 128 and a surface 146 of the rear housing 140. The spring 130 functions to bias the anti-rotation portion 128 of the hub 122 into the anti-rotation seat 112 of the front housing 110. Because the ferrule 124 is connected to the hub 122, the spring 130 also functions to bias the ferrule 124 in a forward direction through the front bore 116. The elongated cylindrical rear portion 123 of the hub 122 extends into the cavity 114 of the front housing 110. The hub 122 includes a passage 119 extending along the longitudinal axis 200.

An outer surface 143 of the rear housing 140 is held engagingly in a rear bore 117 the front housing 110. The rear housing 140 includes a passage 147. A rear portion 145 of the rear housing 140 extends along the longitudinal axis 200 into the bore 152 of the boot 150. The crimp ring 395 is slid over the rear portion 145 and the reinforcing layer 400, and crimped in place over the rear portion 145. Arms 151 of the boot 150 extend over tabs 144 formed by the rear portion 145 to hold the rear housing 140 to the boot 150. A passage 152 extending through the boot 150 is coaxially aligned with passage 147 of the rear housing 140 and passage 119 of the hub 122. The passage 119, in turn, is coaxially aligned with the passage 118 of the ferrule 124 and is sized to receive a bare fiber of a fiber optic cable. The rear housing 140 is held to front housing 110 with an interference fit.

The cable 101, not shown in FIGS. 4–6, is extended through the passages 152 and 147, and the fiber 102 is extended through the passages 118 and is glued to the ferrule 124. The jacket 103 extends through the passage 119 and can abut the ferrule 124. The jacket 103 is glued to the hub 122.

In the example embodiment, the anti-rotation portion 128 includes opposing surfaces 190 and 191 and opposing surfaces 192 and 193, as well as edges 194–197. The anti-rotation portion 128 includes a plurality of sides and the anti-rotation seat 112 defines a seat of a complementary geometry, as shown in FIGS. 5 and 6. Engagement surfaces 181–188 formed by the anti-rotation seat 112 are configured to engage the opposing surfaces 190–193 of the anti-rotation portion 128 of the hub 122. The anti-rotation portion 128 and the anti-rotation seat 112 allow for sliding along the longitudinal axis 200, but prevent significant relative rotation. Other mating shapes and configurations are also possible.

The complementary fit between the anti-rotation seat 112 and the anti-rotation portion 128 is designed to maintain the ferrule 124 in a specified orientation with respect to the longitudinal axis 200 of the connector 100. However, small variations in tolerances between the anti-rotation seat 112 and the anti-rotation portion 128 may cause the ferrule 124 to become misaligned a few degrees with respect to the longitudinal axis 200, thereby causing the face 125 of the ferrule 124 to be slightly misaligned, increasing the insertion loss when the connector 100 is mated to another connector through an adapter. Such misalignment can occur during initial assembly. Such misalignment can also occur when an end face of an APC connector is mated with an end face of another APC connector, and then one connector is removed. The spring bias returns the ferrule 124 and the hub 122 to the front position. The longitudinally extending surfaces of the anti-rotation portion 128 and the anti-rotation seat 112 maintain the general rotational positions of the hub 122 and the front housing 110, but small variations may be introduced. If not corrected, the next connection of the connector may result in rotationally misaligned end faces.

Figure 7:
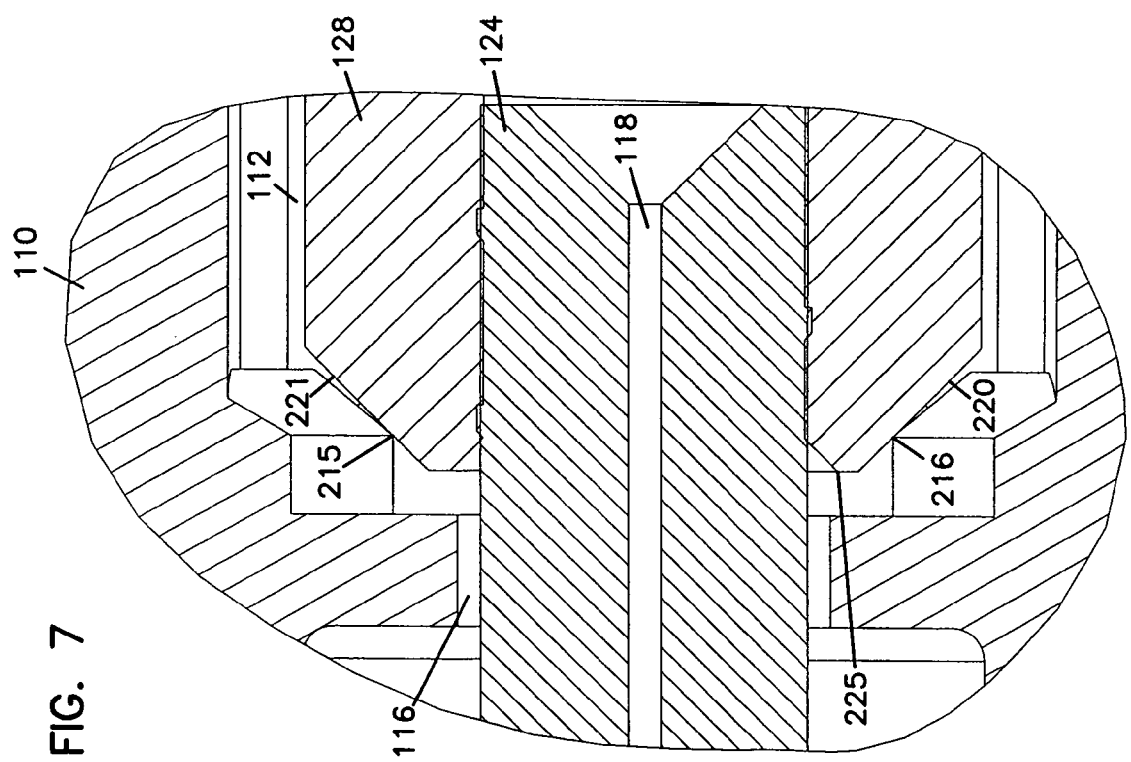
FIG. 7 is an expanded view of a portion of the connector of FIG. 4 showing the engagement of the anti-rotation portion of the hub with the contact lines of the anti-rotation seat.
Figure 9:
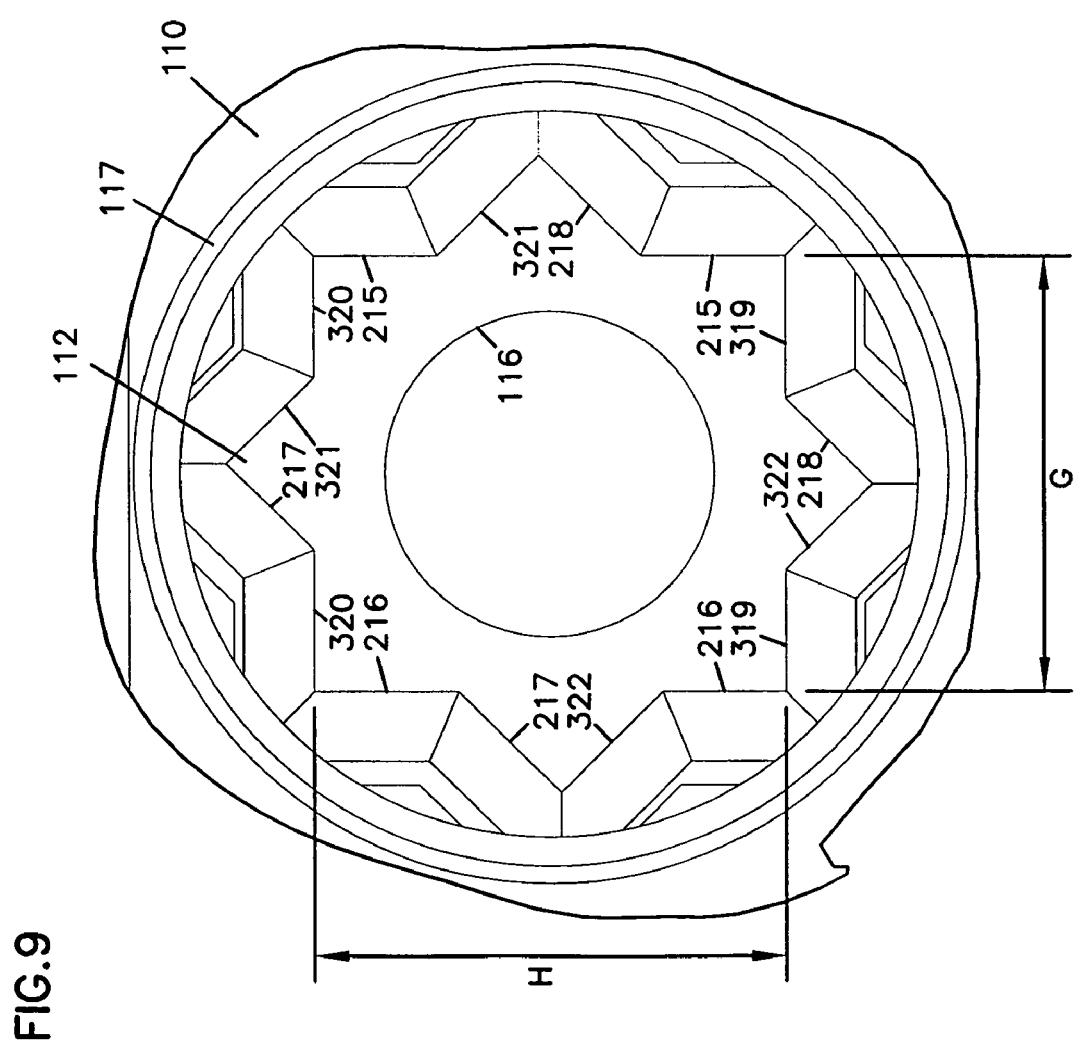
FIG. 9 is an expanded view of a portion of the front housing of the connector of FIG. 8 illustrating the contact lines of the anti-rotation seat of the front housing.

Referring now to FIG. 7, an enlarged view of a portion of the connector 100 is provided. Specifically, engagement of the anti-rotation seat 112 and the anti-rotation portion 128 of the hub 122 is shown. The anti-rotation portion 128 includes tapered surfaces or regions 220 and 221 which extend at an angle with respect to the longitudinal axis 200 to the end face 225 of the anti-rotation portion 128. These tapered regions 220 and 221 engage contact lines 215 and 216, respectively, formed in the anti-rotation seat 112. The contact lines 215 and 216 function to guide and maintain the anti-rotation portion 128 of the hub 122 in proper alignment with respect to the longitudinal axis 200. With the anti-rotation portion 128 of the hub 122 properly aligned, the face 125 of the ferrule 124 and associated fiber 102 will also be properly maintained in alignment. Alternatively, it is possible to form contact lines 215 and 216 on the anti-rotation portion of the hub 122 and to form tapered surfaces 220 and 221 on the anti-rotation seat 112 of the housing 110.

Figure 8:
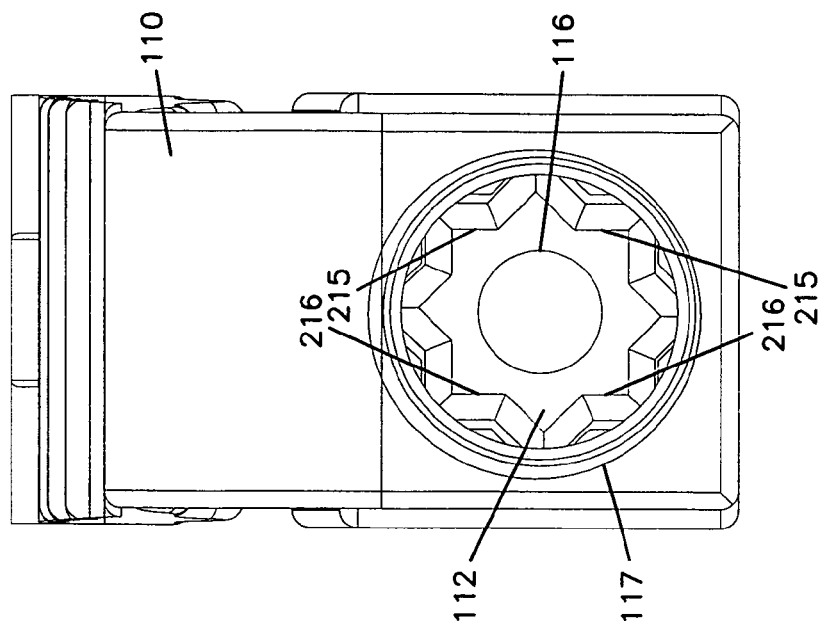
FIG. 8 is a rear view of the connector of FIG. 1 showing the front housing with the hub and ferrule removed.

The contact lines 215 and 216 are shown in FIGS. 7 and 8, which provide rear views through the bore 117 of the front housing 110 with the hub and ferrule assembly 110 removed. Each contact line comprises two separate and longitudinally-aligned edges formed by the anti-rotation seat 112. The contact line 215 is positioned opposite to and parallel with the contact line 216 so that when the tapered regions 220 and 221 engage the contact lines 215 and 216, the anti-rotation portion 218 is held at a known orientation with respect to the longitudinal axis 200. If the hub 122 becomes misaligned when the hub 122 is spaced from contact 215 and 216, re-engagement of the surfaces 220 and 221 with the lines 215 and 216 caused by the spring bias will result in slight re-twisting or other physical correction of the hub 122 to the at rest aligned position.

The anti-rotation seat 112 may also include a second set of parallel contact lines 217 and 218. This second set of contact lines 217 and 218 is positioned at a 45-degree angle about the longitudinal axis 200 with respect to the set of contact lines 215 and 216. The second set of contact lines 217 and 218 can be used to provide additional rotational positions for the ferrule 122 and associated fiber 102 for tuning. A description of how the connector 100 may be tuned, if desired, is provided below.

Lines 319, 320, 321, and 322 may preferably, but need not, be formed so that they act as non-contact lines rather than contact lines. This is accomplished by, for example, making a dimension G extending between contact lines 215 and 216 slightly smaller in size than a dimension H extending between non-contact lines 319 and 320. In this configuration, when the hub 122 is biased towards the front of the housing 110, the tapered regions 220 and 221 engage the contact lines 215 and 216 because of the smaller dimension G between them. The hub 122 therefore fails to contact the non-contact lines 319 and 320 because of the larger dimension H. It is preferably to include non-contact lines 319, 320, 321, and 322 so that manufacturing tolerances for the anti-rotation seat 112 and the anti-rotation portion 128 can more easily be met.

The engagement between the contact lines of the anti-rotation seat and the tapered regions of the anti-rotation portion of the hub is illustrated in FIGS. 10 and 11. In FIG. 10, a representation of a portion of an anti-rotation seat 112' is shown. The anti-rotation seat 112' includes contact lines 215' and 216' and bore 116'. The hub 122 and associated ferrule 124 are shown spaced apart from the anti-rotation seat 112'.

In FIG. 11, the hub 122 is shown engaged with the seat 112'. The tapered regions 220 and 221 engage the contact lines 216' and 215', respectively. Held in this position, such as by the spring 130 (not shown), the hub 122 is aligned with respect to the anti-rotation seat 112' and the longitudinal axis 200 of the connector 100. With the hub 122 aligned in this manner, the face 125 of the ferrule 124 is also maintained in alignment with respect to the longitudinal axis 200. Therefore, the ferrule 124 and the optical fiber 102 (not shown) extending from the passage 119 through the ferrule 124 are maintained at a known orientation with respect to the longitudinal axis 200 of the connector 100 so that the ferrule 124 of the connector 100 can mate with a ferrule of an opposing connector through an adapter. Should the hub 122 become misaligned when separated from the seat 112', upon re-engagement of surfaces 220 and 221 with lines 215' and 216', realignment results.

The anti-rotation portion 128 further includes tapered regions 222 and 223 positioned opposite to and in a parallel arrangement with respect to one another so that the hub 122 can be pushed or pulled, rotated about the longitudinal axis 200 of the connector 100, and then re-engage the contact lines 215' and 216' on the tapered regions 222 and 223.

Tuning of the connector 100 is accomplished by longitudinally pushing the ferrule 124 against the spring bias until the longitudinally extending surfaces of the anti-rotation seat 112 clear the anti-rotation portion 128 of the hub 122. Then hub 122 is rotated to a second position to re-orient the ferrule 124 relative to the front housing 110. In the example embodiment, there are 8 selectable positions for tuning. Fewer or more positions can be included, if desired. Tuning can be by any method useful to determine the desired rotational position of the ferrule 124 in the connector 100. Once the ferrule 124 has been rotated to the desired rotational alignment, the ferrule 124 can be released and the spring 130 can once again bias the anti-rotation portion 128 of the hub 122 into the anti-rotation seat 112 of the front housing 110, thereby preventing further rotation. The connector 100 is tuned with respect to the exterior structure matable with an adapter of the type in U.S. Pat. No. 6,142,676. The configuration of the connector 100 is such that it is keyed so that it can only be received in the adapter in one orientation.

Figure 12:
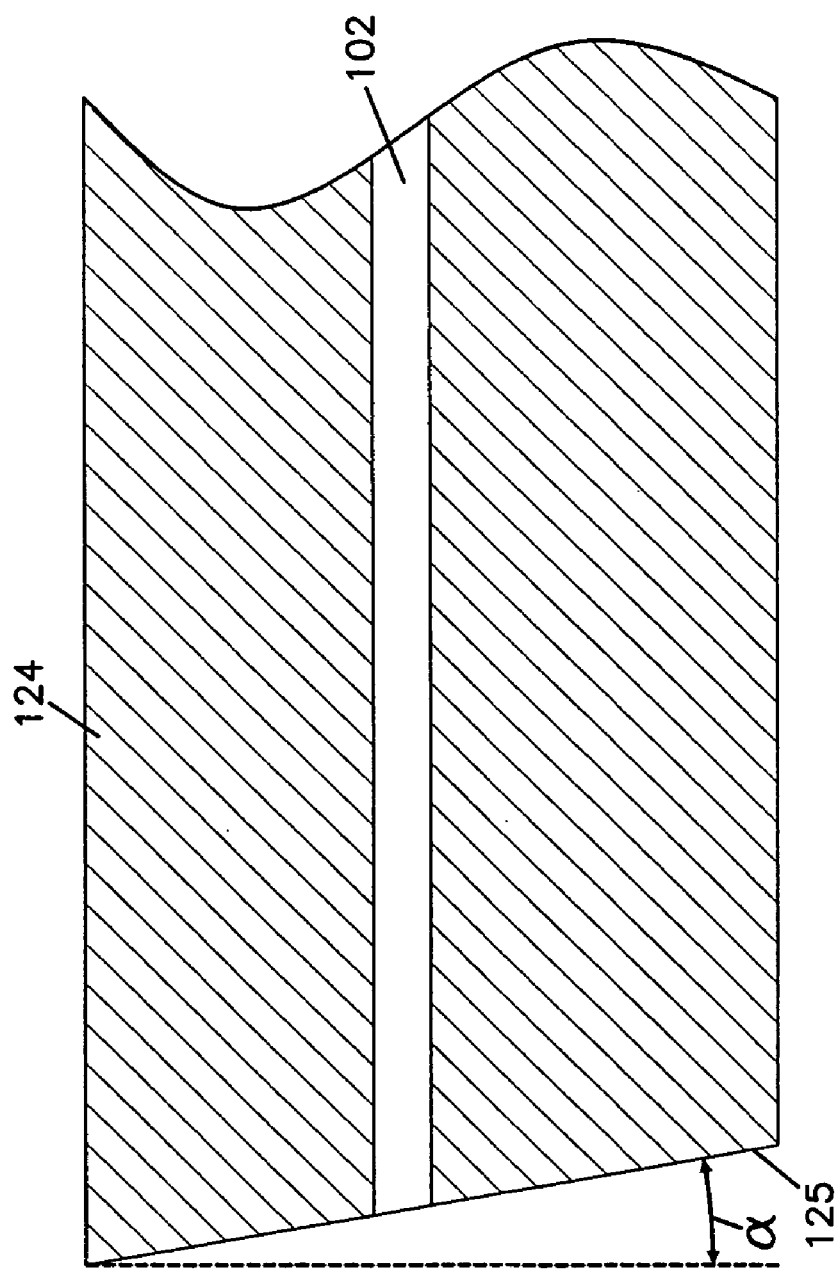
FIG. 12 is an enlarged cross-sectional side view of a ferrule and fiber of an angled physical contact (APC) connector.

The orientation of the face 125 of the ferrule 124 may be particularly important for an angled physical contact connector, in which the end face of the ferrule must be maintained at a specified angle with respect to the longitudinal axis of the connector. In one example embodiment, the angle α is eight degrees, as shown in FIG. 12. Through use of the contact lines on the anti-rotation seat and the tapered regions on the anti-rotation portion of the ferrule, the proper orientation of the ferrule and associated fiber may be maintained in angled physical contact connectors and other connectors.

The above specification, examples and data provide a complete description of the manufacture and of the invention. Since many embodiments of the invention can be made without departing from the spirit and scope of the invention, the invention resides in the claims hereinafter appended.

What is claimed is:

1. A fiber optic connector comprising:
   an optical fiber;
   a ferrule surrounding the optical fiber;
   a hub retainably engaging the ferrule, the hub having a plurality of planar tapered regions extending at an angle with respect to a longitudinal axis of the connector;
   a housing defining an anti-rotation seat including a plurality of contact lines; and
   a spring disposed within a chamber defined by the housing, the spring biasing the ferrule through the housing along the longitudinal axis of the connector;
   wherein at least a portion of the plurality of tapered regions of the hub engages a portion of the plurality of contact lines when the hub and ferrule are biased by the spring in a first position along the longitudinal axis.

2. The connector of claim 1, wherein the plurality of tapered regions of the hub disengages the plurality of contact lines when the hub and ferrule are in a second position along the longitudinal axis.

3. The connector of claim 2, wherein the second position is defined when the connector is coupled to a mating connector.

4. The connector of claim 2, wherein the second position is defined when the connector is being tuned.

5. The connector of claim 1, wherein the hub includes four planar tapered regions.

6. The connector of claim 1, wherein the anti-rotation seat includes contact and non-contact lines, such that the portion of the plurality of tapered regions of the hub engages the contact lines when the hub and ferrule are biased by the spring in a first position, and the portion of the plurality of tapered regions of the hub does not engage the non-contact lines when the hub and ferrule are biased by the spring in a first position.

7. A method for forming a fiber optic connector, the method comprising:
   providing a housing including a plurality of contact lines;
   locating a ferrule surrounding an optical fiber with a hub retainably engaging the ferrule within the housing, the hub including a plurality of tapered portions;
   biasing the ferrule within the housing such that at least a portion of the plurality of tapered portions of the hub engages at least a portion of the plurality of contact lines of the housing.

8. The method of claim 7, further comprising:
   pushing the ferrule back to disengage the plurality of tapered portions of the hub from the plurality of contact lines of the housing; and
   releasing the ferrule so that the portion of the plurality of tapered portions of the hub contacts the portion of the plurality of contact lines of the housing.

9. The method of claim 8, further comprising rotating the ferrule to tune the connector.

* * * * *